(12) United States Patent
Daute

(10) Patent No.: US 10,049,033 B2
(45) Date of Patent: Aug. 14, 2018

(54) APPLICATION GATEWAY FOR CLOUD COMPUTING SYSTEMS

(71) Applicant: Oliver Daute, Duesseldorf (DE)

(72) Inventor: Oliver Daute, Duesseldorf (DE)

(73) Assignee: SAP SE, Walldorf (DE)

(*) Notice: Subject to any disclaimer, the term of this patent is extended or adjusted under 35 U.S.C. 154(b) by 708 days.

(21) Appl. No.: 14/294,736

(22) Filed: Jun. 3, 2014

(65) Prior Publication Data
US 2015/0350341 A1 Dec. 3, 2015

(51) Int. Cl.
G06F 11/36 (2006.01)
H04L 29/08 (2006.01)

(52) U.S. Cl.
CPC ...... *G06F 11/3688* (2013.01); *H04L 67/1004* (2013.01)

(58) Field of Classification Search
None
See application file for complete search history.

(56) References Cited

U.S. PATENT DOCUMENTS

| 7,885,943 B1* | 2/2011 | Yehuda | G06Q 10/10 707/665 |
| 8,255,529 B2 | 8/2012 | Ferris et al. | |
| 8,261,295 B1 | 9/2012 | Risbood et al. | |
| 8,271,974 B2 | 9/2012 | Mazhar et al. | |
| 8,286,181 B2 | 10/2012 | Daute | |
| 8,417,798 B2 | 4/2013 | Chen et al. | |
| 9,244,818 B1* | 1/2016 | Paleja | G06F 21/50 |
| 2005/0165926 A1* | 7/2005 | Motoyama | H04L 41/0213 709/224 |
| 2005/0188345 A1* | 8/2005 | Chang | G06F 8/20 717/101 |
| 2006/0236083 A1* | 10/2006 | Fritsch | G06F 8/65 713/1 |
| 2007/0006217 A1* | 1/2007 | Tammana | G06F 8/61 717/174 |
| 2009/0300151 A1 | 12/2009 | Friedman et al. | |

(Continued)

OTHER PUBLICATIONS

Saripalli et al. "MADMAC: Multiple Attribute Decision Methology for Adoption of Clouds", 2011, 4th International Conference on Cloud Computing.*

(Continued)

*Primary Examiner* — Jue Louie

(74) *Attorney, Agent, or Firm* — Fish & Richardson P.C.

(57) ABSTRACT

The present disclosure involves systems, software, and computer-implemented methods for certifying applications for execution in cloud computing systems. An example method includes identifying an application for execution in a cloud computing system; determining a set of application characteristics associated with the application based at least in part on an automatic analysis of the application; determining whether the application is suitable to be executed in the cloud computing system based at least in part on the determined set of application characteristics; and in response to determining that the application is suitable for use in the cloud computing system, storing the application and at least a portion of the determined set of application characteristics in an application repository.

20 Claims, 5 Drawing Sheets

(56) References Cited

U.S. PATENT DOCUMENTS

| | | | |
|---|---|---|---|
| 2010/0180023 A1* | 7/2010 | Kraus | H04L 43/08 709/224 |
| 2010/0225957 A1* | 9/2010 | Liu | G06F 9/4411 358/1.15 |
| 2011/0167474 A1* | 7/2011 | Sinha | G06F 21/56 726/1 |
| 2011/0265168 A1 | 10/2011 | Lucovsky et al. | |
| 2011/0270963 A1* | 11/2011 | Saito | G06F 21/105 709/224 |
| 2011/0270968 A1* | 11/2011 | Salsburg | G06F 9/5072 709/224 |
| 2012/0030731 A1* | 2/2012 | Bhargava | G06F 21/54 726/3 |
| 2012/0036442 A1* | 2/2012 | Dare | G06F 8/60 715/736 |
| 2012/0102193 A1* | 4/2012 | Rathore | G06F 9/06 709/224 |
| 2012/0102486 A1 | 4/2012 | Yendluri | |
| 2012/0117559 A1 | 5/2012 | Vorthmann et al. | |
| 2012/0130702 A1* | 5/2012 | Citron | G06F 11/3672 703/22 |
| 2012/0266158 A1 | 10/2012 | Spivak et al. | |
| 2013/0097320 A1 | 4/2013 | Ritter et al. | |
| 2013/0104100 A1 | 4/2013 | Mueller | |
| 2013/0111257 A1 | 5/2013 | Broda et al. | |
| 2013/0117719 A1 | 5/2013 | Bender et al. | |
| 2013/0124475 A1 | 5/2013 | Hildenbrand et al. | |
| 2013/0290509 A1* | 10/2013 | Behle | H04L 61/60 709/224 |
| 2013/0297606 A1* | 11/2013 | Tola | G06F 17/30873 707/737 |
| 2014/0122577 A1* | 5/2014 | Balasubramanian | G06F 9/5072 709/203 |
| 2014/0278623 A1* | 9/2014 | Martinez | G06F 8/36 705/7.12 |
| 2014/0278808 A1* | 9/2014 | Iyoob | G06Q 30/0206 705/7.35 |
| 2014/0359129 A1* | 12/2014 | Sharma | H04L 47/70 709/226 |
| 2015/0121155 A1* | 4/2015 | Boshev | H04L 67/10 714/48 |
| 2015/0264128 A1* | 9/2015 | Huang | H04L 67/1014 709/203 |

OTHER PUBLICATIONS

Oracle, "Cloud Candidate Selection Tool: Guiding Cloud Application", 2011, Oracle White Paper, retrieved from: http://web.archive.org/web/20120625185411/http://www.oracle.com/technetwork/topics/entarch/oracle-wp-cloud-candidate-tool-r3-0-1434931.pdf.*

Khajeh-Hosseini et al. "The Cloud Adoption Toolkit: supporting cloud adoption decisions in the enterprise", 2012, Software Practice and Experience, vol. 12, pp. 447-465.*

Cloud Standards Customer Council, "Migrating Applications to Public Cloud Services: Roadmap for Success", Dec. 2013.*

Oracle Cloud Tools—Oracle Cloud Web Project; 4 pages; <<http://docs.oracle.com/cd/E27086_05/help/oracle.eclipse.tools.cloud.doc/html/index.html>> [Retrieved May 29, 2014 5:56:01 PM].

\* cited by examiner

US 10,049,033 B2

APPLICATION GATEWAY FOR CLOUD COMPUTING SYSTEMS

BACKGROUND

The present disclosure involves systems, software, and computer-implemented methods for certifying applications for execution in cloud computing systems.

Cloud computing systems, generally, are distributed processing systems including multiple computing devices connected by and communicating over a network. Software applications may be run "in the cloud" by configuring them to execute across one or more of the computing devices in a particular cloud computing system. The computing devices of a cloud computing system may each execute separate copies of the software application, or, in some cases, the operations of the software application may be split among different computing devices and executed in parallel.

SUMMARY

The present disclosure involves systems, software, and computer-implemented methods for certifying applications for execution in cloud computing systems. In one general aspect, an example method includes identifying an application for execution in a cloud computing system; determining a set of application characteristics associated with the application based at least in part on an automatic analysis of the application; determining whether the application is suitable to be executed in the cloud computing system based at least in part on the determined set of application characteristics; and in response to determining that the application is suitable for use in the cloud computing system, storing the application and at least a portion of the determined set of application characteristics in an application repository.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Figure 1:
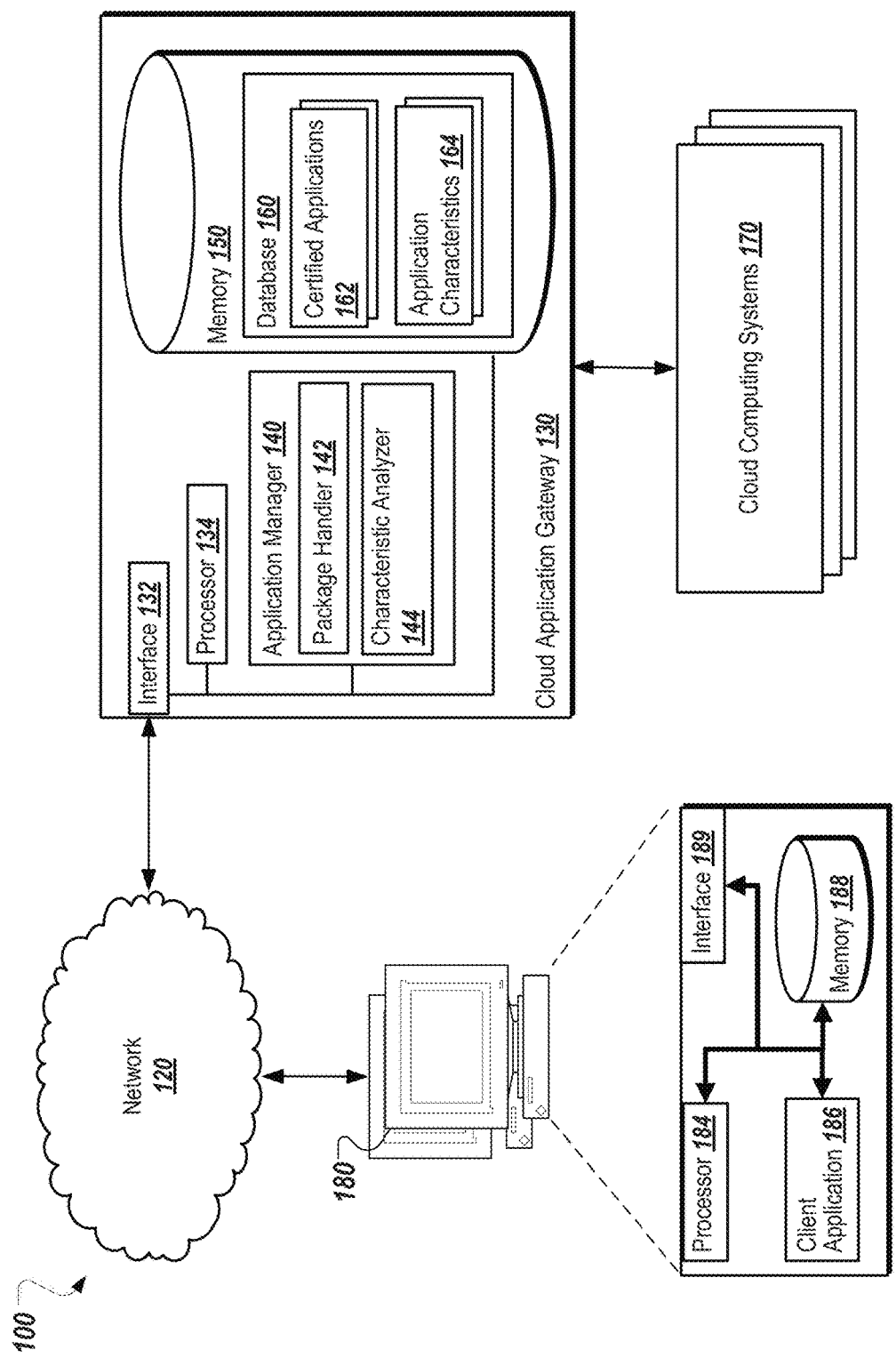
FIG. 1 is a block diagram illustrating an example environment for certifying applications for execution in cloud computing systems.

The present disclosure involves systems, software, and computer-implemented methods for certifying applications for execution in cloud computing systems.

Generally, cloud computing systems enable rapid provisioning of system capacities for applications and data storage. Some systems may provide complete platform and infrastructure services for the building, testing and deploying of new software applications. In order to take advantage of the capabilities of cloud computing systems, application developers and other stakeholders may convert or port existing software applications for use in the cloud. Allowing application developers to run incompatible or malicious applications in a cloud computing system may lead to serious problems, such as slow performance for other applications or data loss.

The present disclosure describes techniques for certifying applications for execution in cloud computing systems, such as, for example, by an application gateway. In one example implementation, entities may supply applications to be executed on a cloud computing system to an application gateway along with information about the application. The application gateway analyzes the application and the information about the application to determine a set of application characteristics. For example, the application gateway may determine, based on analyzing the application, a set of communication protocols supported by the application. Such automatic analysis may include executing the application in a simulated environment to observe its behavior. Based at least in part on the application characteristics, a determination is made whether the application is suitable for execution in the cloud computing system. For example, the application gateway may determine that an application is suitable for execution in a particular cloud computing system if all the determined application characteristics are compatible with the particular cloud computing system. For instance, if the particular cloud computing system supports a communication protocol that the application also supports, then the application and the cloud computing system may be compatible with respect to that particular application characteristic. The application gateway may also determine that an application is not suitable for execution in a particular cloud computing system if one or more of the determined application characteristics are incompatible with the particular cloud computing system. In some cases, the application characteristics may include application type, test scenarios, communication characteristics, management characteristics (e.g., monitoring interfaces, dependencies, restore procedures), security characteristics, or other characteristics. A set of metadata may also be provided with the application by the requesting entity including information about the application, such as its author or owner, execution requirements (e.g., performance requirements, expected users, reliability), or other information. In some cases, the application characteristics are determined based at least in part on the set of metadata. If the application is determined to be suitable for execution in the cloud computing system, the application may be stored in an application repository along with the determined set of application characteristics.

Implementations according to the present disclosure may provide several advantages over prior techniques. By certifying applications for execution on a cloud computing system prior to their use in the cloud computing system, system owners may ensure that the integrity and stability of the cloud computing system are not compromised by faulty or malicious applications executed on the system. Further, by storing certified applications in an application repository, users of the cloud computing system may be offered a catalog of certified applications for execution on the system that are known to perform as expected in the particular system. Such a catalog may increase the utility of a cloud computing system to end users, leading to higher end user satisfaction. In addition, automated mechanisms in the cloud computing system may use the application characteristics to control the operation of cloud applications or to restart applications after failures in an appropriate way or sequence.

FIG. 1 is a block diagram illustrating an example environment 100 for certifying applications for execution in cloud computing systems. As shown, a network 120 connects one or more clients 180 to a cloud application gateway 130. The client application gateway 130 is connected to one or more cloud computing systems 170. In operation, the one or more clients 180 may submit applications to be executed in the one or more cloud computing systems 170 to a cloud application gateway 130. The cloud application gateway 130 may analyze the submitted applications to determine whether the applications are suitable for execution in the one or more cloud computing systems 170. If the application gateway 130 determines that a particular application is suitable for execution, the application may be stored in a database 160 as one of one or more certified applications 162. Further, the client application gateway 130 may determine one or more application characteristics associated with the particular application, which may also be stored in the database 160 as application characteristics 164. The certified applications 162 may be executed by the cloud computing systems 170.

The environment 100 includes the cloud application gateway 130. In some cases, the client application gateway 130 may be a server or set of servers connected to the network 120 and to the one or more cloud computing systems 170. In some implementations, the client application gateway 130 may be associated with one of the particular cloud computing systems 170, such that each of the cloud computing systems 170 is associated with one or more cloud application gateways 130. The cloud application gateway 130 may, in some cases, be a component within one of the cloud computing system 170.

As used in the present disclosure, the terms "computer" and "server" are intended to encompass any suitable processing device. For example, although FIG. 1 illustrates a cloud application gateway 130, environment 100 can be implemented using two or more servers, as well as computers other than servers, including a server pool. Indeed, cloud application gateway 130 may be any computer or processing device such as, for example, a blade server, general-purpose personal computer (PC), MAC, workstation, UNIX-based workstation, or any other suitable device. In other words, the present disclosure contemplates computers other than general purpose computers, as well as computers without conventional operating systems. Further, illustrated cloud application gateway 130 may be adapted to execute any operating system, including LINUX, UNIX, WINDOWS, MAC OS, JAVA, ANDROID, iOS or any other suitable operating system. According to one implementation, cloud application gateway 130 may also include or be communicably coupled with an e-mail server, a Web server, a caching server, a streaming data server, and/or other suitable server.

The cloud application gateway 130 also includes an interface 132, a processor 134, and a memory 150. The interface 132 is used by the cloud application gateway 130 for communicating with other systems in a distributed environment—including within the environment 100—connected to the network 120; for example, the clients 180, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or interface's hardware is operable to communicate physical signals within and outside of the illustrated environment 100.

As illustrated in FIG. 1, the cloud application gateway 130 includes a processor 134. Although illustrated as a single processor 134 in FIG. 1, two or more processors may be used according to particular needs, desires, or particular implementations of environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the cloud application gateway 130.

The client application gateway 130 includes an application manager 140. The application manager 140 may be operable to receive requests to certify applications (e.g., check in requests), and to analyze the applications associated with the requests to determine whether the application is compatible with the one or more cloud computing systems 170. In some cases, application manager 140 may determine that a particular application is compatible with one or more of the cloud computing systems 170, and incompatible with one or more different cloud computing systems from the cloud computing systems 170. In some cases, the application manager 140 may be a software process or set of software processes executed by the cloud application gateway 130. The application manager 140 may also be distributed across multiple servers.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Application manager 140 includes a package handler 142. The package handler 142 may be a component or module within the application manager 140 operable to receive a request to certify an application including an application package. The package handler 142 may also be a separate software process from the application manager 140. In some implementations, the package handler 140 may parse the application package. The application package may include the application to be certified, and metadata associated with the application such as, for example, application programming interfaces (APIs) supported or used by the application, test scenarios associated with the application, documentation associated with the application, an author associated with the application, or other types of metadata. The packaging were 142 may be operable to receive requests according to one or more network protocols, including, but not limited to, Hypertext Transfer Protocol (HTTP), Remote Procedure Call (RPC), Simple Object Access Protocol (SOAP), or other network protocols. In some cases, the application package may include structured or unstructured data, and may be formatted according to one or more data formats, such as, for example, Extensible Markup Language (XML), JavaScript Object Notation (JSON), Hypertext Markup Language (HTML), Comma Separated Values (CSV), or other formats.

As shown, the application manager 140 includes a characteristic analyzer 144. In operation, the characteristic analyzer 144 determines a set of application characteristics associated with an application included in a received request to certify. In some cases, the characteristic analyzer 144 may analyze the application to be certified and/or the metadata associated with the application to be certified to determine the application characteristics. In some cases, the characteristic analyzer 144 may generate and execute test scenarios against the application determine application characteristics associated with its behavior in certain situations. For example, the characteristic analyzer 144 may execute the application and perform stress testing on the application to determine the maximum required performance level. Characteristic analyzer 144 may also execute the application and attempt to communicate with it using different protocols to determine communication methods the application supports.

The characteristic analyzer 144 may also analyze the metadata associated with the application to determine application characteristics. For example, the metadata may include performance characteristic requirements for the application, and the characteristic analyzer 144 may include these requirements in the application characteristics. In some cases, the metadata associated with the application may include an author associated with the application. In such cases, the characteristic analyzer 144 may determine that the author is a trusted application author, and may change its analysis based on this trusted state. For example, if application author is trusted by one of the cloud computing systems 170, the characteristic analyzer 144 may certify applications associated with this author for use in the particular cloud computing system 170 without performing additional analysis, or by performing additional analysis and including the trusted status in the suitability determination. In some cases, the characteristic analyzer 144 may perform a truncated or modified analysis based on the trusted status, such as, for example, omitting some of the analysis.

The characteristic analyzer 144 may also determine, based on the application characteristics, whether a particular application is suitable for execution in the one or more cloud computing systems 170. In some implementations, an application may be suitable for execution if the characteristic analyzer 144 determines that the application characteristics associated with the application that are compatible with or supported by a particular cloud computing system 170. For example, if a particular cloud computing system 170 supports a communication protocol that the application supports, the particular cloud computing system 170 may be compatible with the application with respect to communication. The suitability determination may also be based on specific configurations for each computing system 170. For example, a particular cloud computing system 170 may support a particular performance requirement associated with an application, but the application may be determined to be unsuitable for execution in the cloud computing system 170 based on a restriction on resource usage by applications of a particular type. In some cases, the application may be determined to be not suitable for execution on the one or more cloud computing systems 170 based on the determined application characteristics. For example, if the application only supports communication protocols that are not supported by the one or more cloud consistent computing systems 170, the characteristic analyzer 144 may determine that the application is not suitable for execution.

Cloud application gateway 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the cloud application gateway 130. Additionally, the memory 150 may include any other appropriate data, such as VPN applications, firmware logs and policies, firewall policies, a security or access log, print or other reporting files, as well as others.

As illustrated in FIG. 1, memory 150 includes or references data and information associated with and/or related to providing the network service load control. As illustrated, memory 150 includes a database 160. The database 160 may be one of or a combination of several commercially available database and non-database products. Acceptable products include, but are not limited to, SAP® HANA DB, SAP® MaxDB, Sybase® ASE, Oracle® databases, IBM® Informix® databases,DB2, MySQL, Microsoft SQL Server®, Ingres®, PostgreSQL, Teradata, Amazon SimpleDB, and Microsoft® Excel, as well as other suitable database and non-database products. Further, database 160 may be operable to process queries specified in any structured or other query language such as, for example, Structured Query Language (SQL).

As shown, the database 160 includes one or more certified applications 162. The certified applications 162 may represent applications that have been certified as suitable for execution on at least one of the one or more cloud computing systems 170 by the application manager 140. In some cases, the certified applications 162 may include the application package received by the application manager 140 when certification of the application was requested. In some implementations, the certified applications 162 may include a representation of the application that has been certified, such as, for example, an executable file, an installation package, a library, a disk image, a Uniform Resource Locator (URL) or other identifier indicating a location of the application, or another representation. In some cases, each of the certified applications 162 may include identifying information for the application, such as, for example, a name, a version, an author, or other information. Certified applications 162 may also include the set of metadata received in the request to certify the application. In some cases, the certified applications 162 may be stored in a table or set of tables within the database 160.

Database 160 also includes application characteristics 164. In some cases, the application characteristics 164 may be the application characteristics produced by the characteristic analyzer 144. The application characteristics 164 may be stored in one or more tables, one or more rows within a table, one or more objects, or in other constructs within the database 160. The application characteristics 164 may include structured or unstructured data, such as data formatted according to one or more data formats, such as, for example, XML, JSON, HTML, CSV, or other formats.

Illustrated client 180 is intended to encompass any computing device, such as a desktop computer, laptop/notebook computer, wireless data port, smart phone, personal data assistant (PDA), tablet computing device, one or more processors within these devices, or any other suitable processing device. For example, client 180 may comprise a computer that includes an input device, such as a keypad, touch screen, or other device that can accept user information and an output device that conveys information associated with the operation of the cloud application gateway 130 or client 180 itself, including digital data, visual information, or a graphical user interface (GUI). Client 180 may include an interface 189, a processor 184, a memory 188 and a client application 186. In some implementations, the client application 186 may be a web browser. Client 180 may be used by a user to access the cloud application gateway 130, such as to submit applications to the cloud application gateway 130 for certification.

The application gateway 130 may function as a "check-in component" for the one or more cloud computing systems 170. As described above, the application gateway 130 determines characteristics of applications before they are deployed in the one or more cloud systems 170. Using these application characteristics, a more detailed view of applications, their range of service, functions and combinability may be obtained. The application gateway 130 ensures that applications to be executed on the one or more cloud computing systems 170 meet the requirements and standards associated with the particular systems. In some implementations, the application characteristics describe several aspects of a particular application, including domain and subclasses, communication methods, range of usage, restorability and maintainability, security, or other aspects. As described above, these aspects are checked by the application gateway 130 in response to a request to certify an application.

In some implementations, the cloud application gateway 130 may determine different level of compatibility for different applications. For example, an application may be "first degree compatible" with a particular cloud computing system 170 if it meets a set of basic requirements concerning data security and operations for the particular cloud computing system 170. An application may be "second degree compatible" with the particular cloud computing system 170 if it meets additional requirements, such as the ability to be used in combination with other applications. An application may be "third degree compatible" if it can leverage middleware for distributed and encrypted data. Applications may be "fourth degree compatible" if they are able to run on different cloud environments, are able to run with other applications in composite-use, and make use of distributed and encrypted databases. In some cases, applications at any of these degrees of compatibility may be determined to be compatible with a particular cloud. Additional degrees of compatibility are also contemplated, and additional aspects may be included at each degree described above. In some cases, applications that do not fulfill requirements to execute on a particular cloud computing system 170 are "zero degree compatible" or incompatible.

Figure 2:
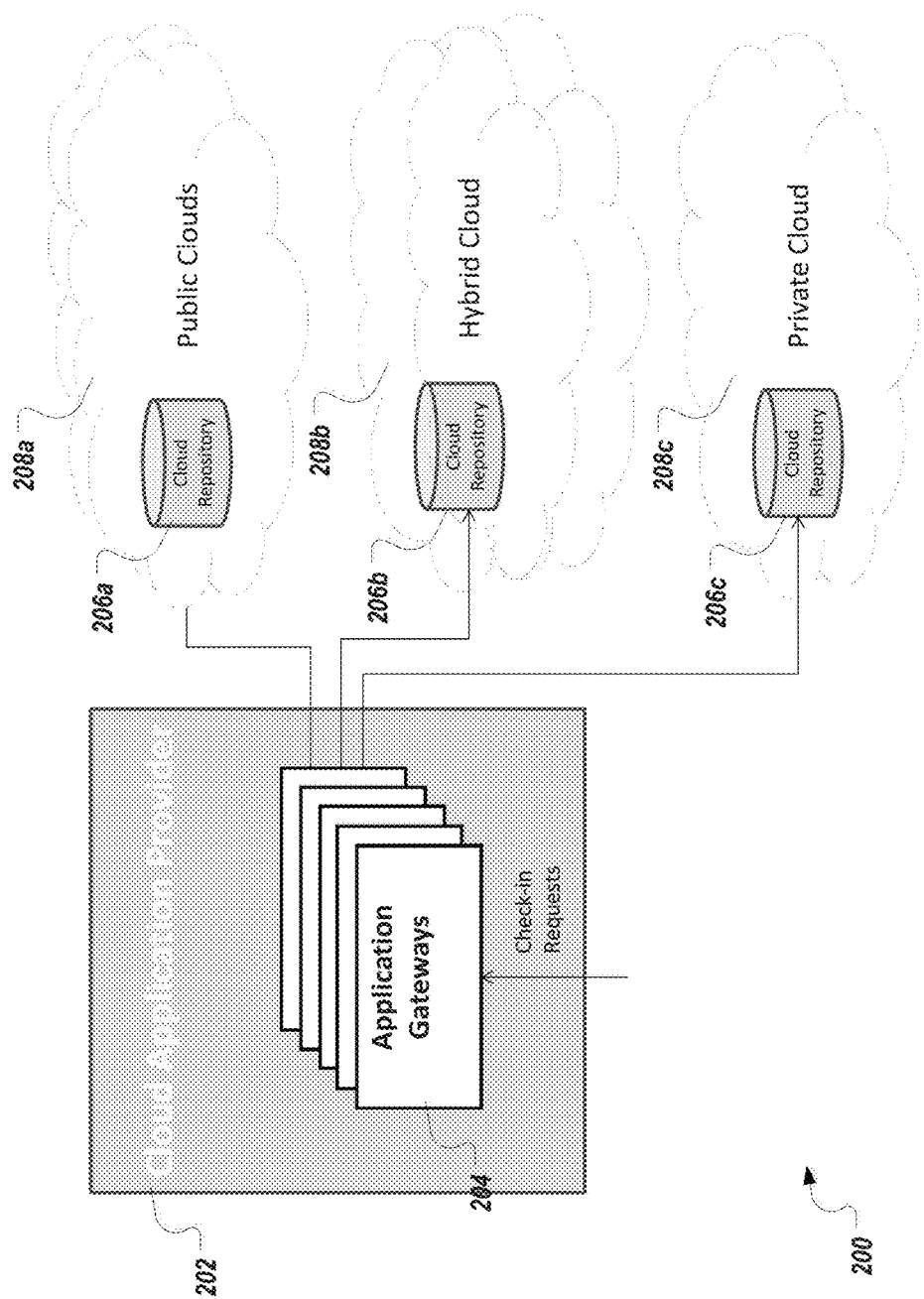
FIG. 2 is a block diagram illustrating an example environment including multiple application gateways serving multiple clouds.

FIG. 2 is a block diagram illustrating an example environment 200 including multiple application gateways 204 of a cloud application provider 202 serving multiple clouds 206a-c. As shown, the application gateways 204 received check in requests 210, such as from the one or more clients 180 discussed in FIG. 1. The application gateways 204 may determine whether applications included in the check in requests 210 are suitable for execution in the one or more clouds 208a-c. The application gateways 204 may also determine application characteristics for the applications are included in the check and request 210. If the application is suitable to be executed on a particular one of the clouds 208a-c, the application gateways 204 may insert data corresponding to the application (e.g., the certified application 162, the application characteristics 164, or other data) into one of the cloud repositories 206a-c corresponding to the particular cloud. Cloud repositories 206a-c may be databases (e.g., database 160) hosted in or associated with the one or more clouds 208a-c.

As shown, the one or more clouds 208a-c include different types of cloud computing systems, such as, for example, public clouds, hybrid clouds, and private clouds. Public clouds may be cloud computing systems that offer computing services to the public, while private clouds may be used by a single entity or a limited group of entities. Hybrid clouds may include portions that are public and portions that are private.

Figure 3:
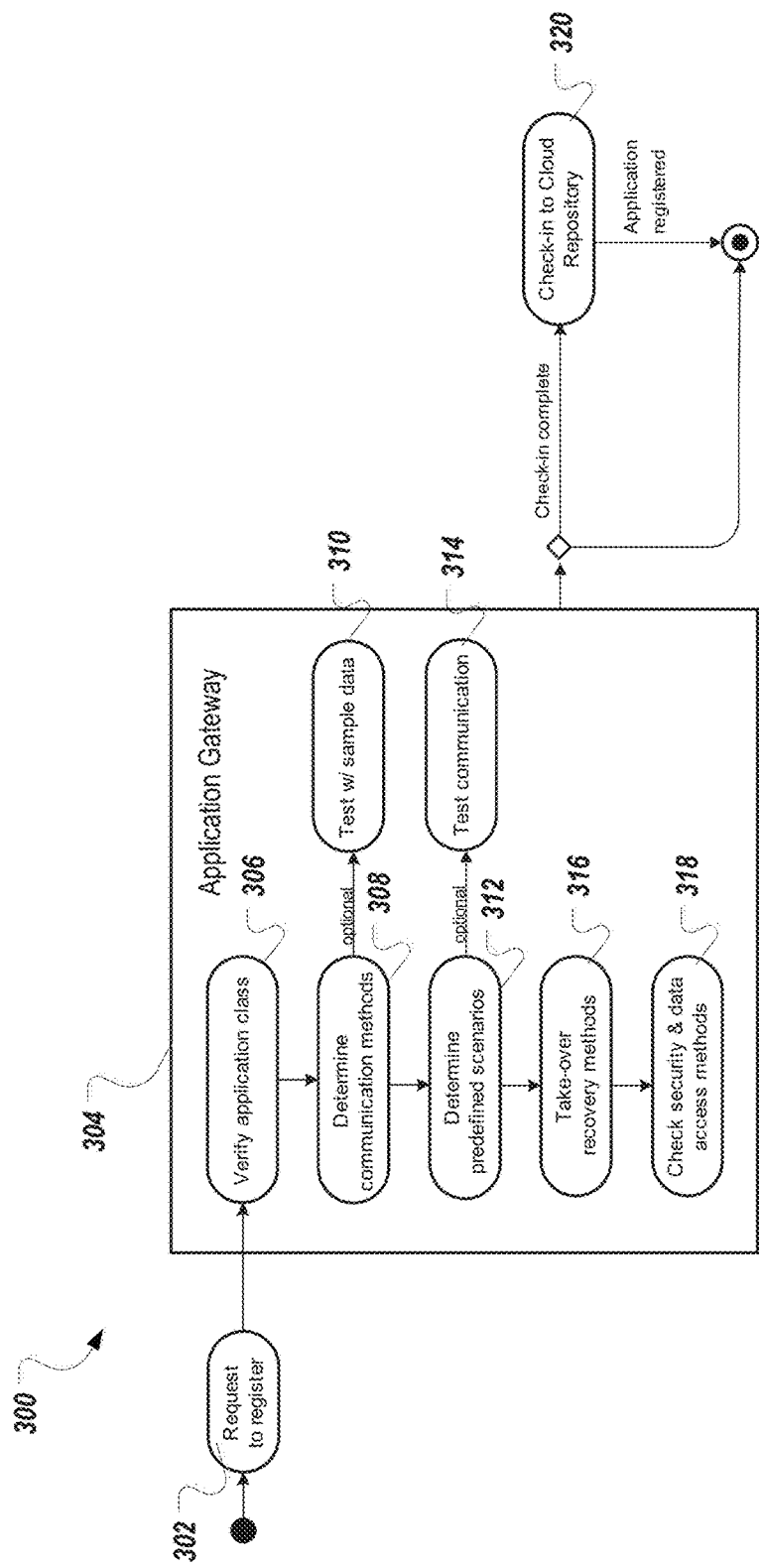
FIG. 3 is a flow chart illustrating operations of an example application certification process performed by an application gateway.

FIG. 3 is a flow chart illustrating operations of an example application certification process 300 performed by an application gateway 304. At 302, a request for registration of a new application is sent to the application gateway 304. After the application gateway 304 receives the request, the application gateway 304 determines characteristics of the application. In some cases, if all checks (306-318) are successful, the application and the determined application characteristics will be stored in a cloud repository (e.g., 206a-c in FIG. 2). The application may then be available for execution within the cloud computing system associated with the cloud repository to consumers, developers and for automated mechanisms for the controlling and distributing of applications.

At 306, the application gateway 304 determines an application class or the application, such as, for example, enterprise resource planning (ERP), mail, office or other domains. Each domain may include subclasses, for instance, financial, controlling, or payroll in the case of ERP software. The application gateway 304 may also determine requirements of installation and use at run-time for the application, such as power, storage, memory, network, or other requirements. In some cases, the application gateway 304 may determine application characteristics which determine usage parameters for the application, such as scalability (e.g., number of users), availability (e.g., reliability), and measurable performance indicators (e.g., processing speed).

At 308, communication methods are determined for the application. In some cases, the application to be registered may be executed and profiled to determine its communication capabilities, such as, for example, its supported communication techniques between applications, its supported communication techniques communication with cloud platform, its supported APIs, its supported file formats, or other capabilities. At 310, the application gateway 304 optionally tests the application with sample data. In some cases, the sample data may be generated by the application gateway 304, or may be provided as part of the request to register the application.

At 312, predefined test scenarios are determined by the application gateway 304. In some cases, the application gateway may profile the application to determine information about functions, workflows and predefined business scenarios included in the application. Predefined business scenarios describe which combinations with other applications are reasonable. In some cases, interfaces (adapters), third-party software or middleware may be specified by the application. In some cases, such information may be specified in a standard format, such as, for example, Web Services Description Language (WSDL). The application gateway 304 may also check for proper functionality of the defined application components, such as by generating and executing automated test scenarios for the application. At 314, communication methods for the application may optionally be verified, such as using automated test scenarios generated at 312.

At 316, recovery methods for the particular application are identified. The recovery methods may be evaluated to determine various aspects of the recovery procedure for an application, such as, restorability, a restore point, a monitoring procedure, maintenance tools associated with the application, Simple Network Management Protocol (SNMP) management information bases (MIBs) for monitoring the application, and other information.

At 318, security and access information for the application is determined. In some implementations, this information may be determined by the application gateway 304 by performed security audits of the application and/or the application code, stress testing of the application, buffer overflow detection on the application, port scanning of the application, encryption testing of the application, or other suitable procedures. In some cases, the security and access information may be determined based on previous security test results submitted with the application request at 302. At 320, if the application gateway 304 determines that the application is suitable for execution in the associated cloud computing system, the application gateway 304 may check the application into a cloud repository. In some cases, such as cases where the application is not determined to be suitable, the application may be checked-in to the cloud repository as an untrusted application, such that only administrators can run the application (e.g., to attempt to manually verify its suitability for execution in the cloud computing system).

Figure 4:
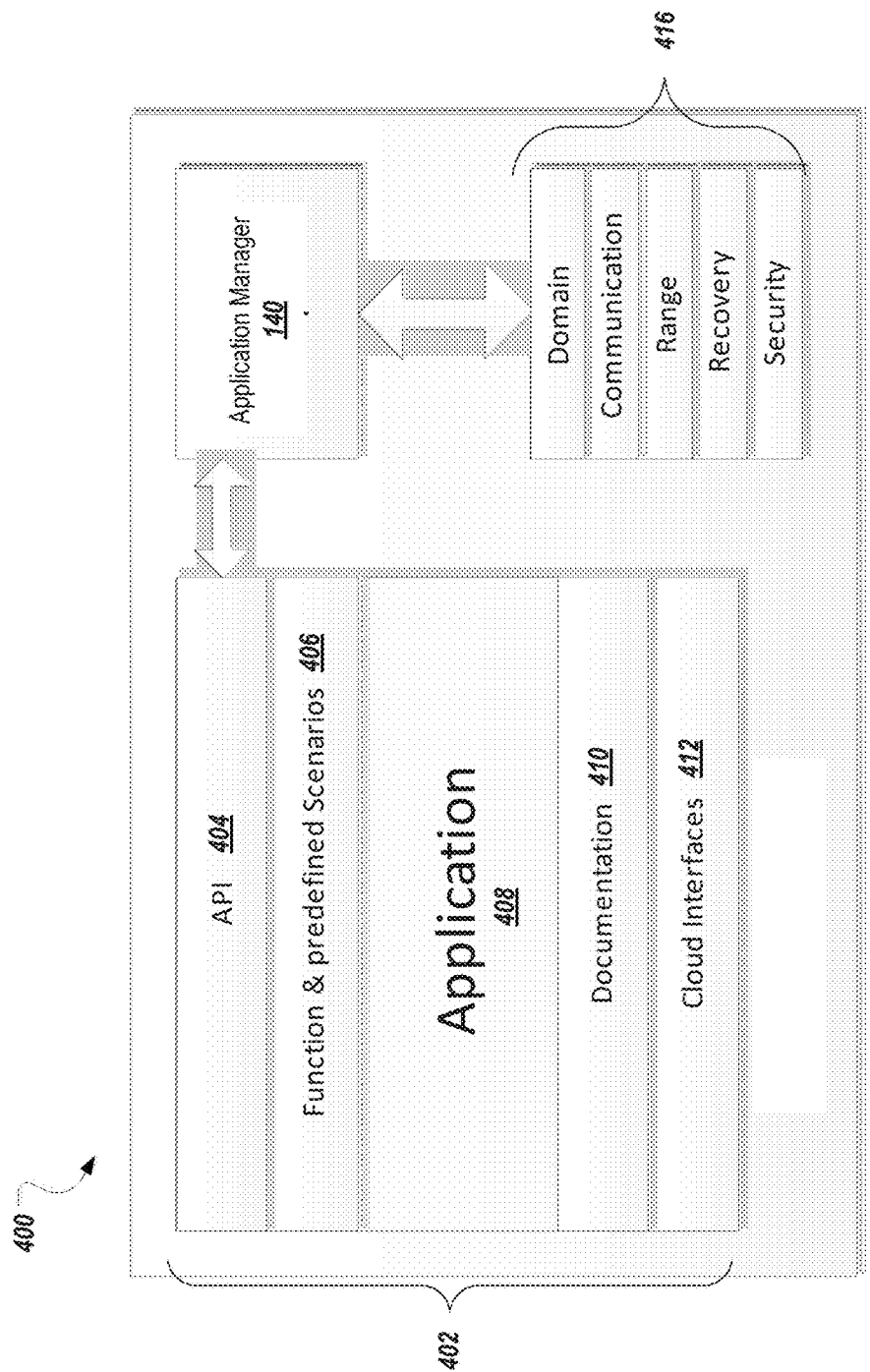
FIG. 4 is a flow diagram illustrating an example process for receiving and analyzing an application package by an application manager.

FIG. 4 is a flow diagram illustrating an example process 400 for receiving and analyzing an application package by an application manager. As shown, an application package 402 is processed by the application manager 140 (previously described relative to FIG. 1) to produce a set of application characteristics 416. The application package 402 may include an application 408 associated with the application packet 402, a set of APIs 404 supported by the application 408, a set of predefined test scenarios 406 associated with the application 408, a set of documentation associated with the application 410, a set of cloud interfaces 412 associated with the application. In some cases, the application package 402 may include additional information associated with the application 408.

The application manager 140 receives the application package 402. The operations of the application manager 140 are previously described with respect to FIGS. 1-3. As shown, the application manager 140 produces a set of application characteristics 416. These application characteristics 416 are also previously described with respect to FIGS. 1-3.

Figure 5:
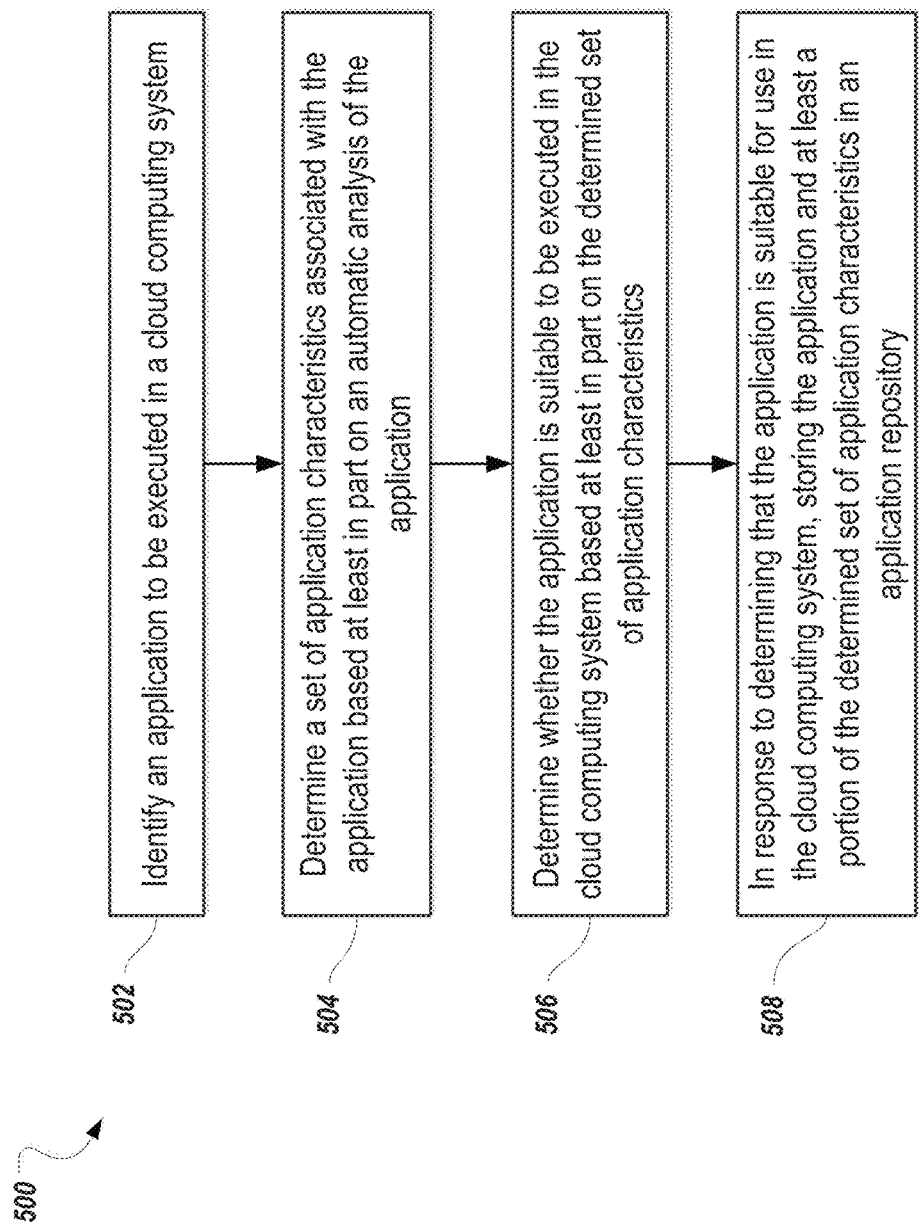
FIG. 5 is flow chart showing an example method for certifying applications for execution in cloud computing systems.

FIG. 5 is flow chart showing an example method 500 for certifying applications for execution in cloud computing systems. For clarity of presentation, the description that follows generally describes method 500 in the context of FIGS. 1-4. However, method 500 may be performed, for example, by any other suitable system, environment, software, and hardware, or a combination of systems, environments, software, and hardware, as appropriate. For example, one or more of the cloud application gateway, the client, or other computing device (not illustrated) can be used to execute method 500 and obtain any data from the memory of the client, cloud application gateway, or the other computing device (not illustrated).

At 502, an application to be executed in a cloud computing system is identified. In some cases, identifying the application to be executed in the cloud computing system includes identifying a set of metadata associated with the application.

At 504, a set of application characteristics associated with the application is determined based at least in part on an automatic analysis of the application. In some cases, the automatic analysis of the application may be based on an analysis of a set of metadata associated with the application. In some cases, determining the set of application characteristics includes determining one or more test scenarios for the application; and automatically executing the application according to the one or more test scenarios to determine a set of test results associated with the application, wherein the set of application characteristics is determined based at least in part on the set of test results.

At 506, a determination is made whether the application is suitable to be executed in the cloud computing system. A determination is based at least in part on the determined set of application characteristics.

At 508, in response to determining that the application is suitable for use in the cloud computing system, the application and at least a portion of the determined set of application characteristics are stored in an application repository. In some cases, the application repository is configured to store applications for use in the cloud computing system.

In some cases, in response to determining that the application is not suitable for use in the cloud computing system, the application and the determined set of application characteristics are stored in the application repository with an untrusted status, and the application repository is configured to restrict access to applications with the untrusted status.

In some cases, the set of metadata includes an author of the application, and the determination of whether the application is suitable for use in the cloud computing system is based at least in part on a trust level associated with the author of the application. The set of metadata may also include a set of application execution requirements associated with the application including at least one of: a number of expected users, an expected reliability level, an expected performance level, or other requirements. In some cases, the set of application characteristics is determined based at least in part on the set of metadata.

In some implementations, determining the set of application characteristics includes determining a set of management characteristics associated with the application including an interface for managing the application, an interface for monitoring the application, a set of dependencies for the application, a restore procedure associated with the application, or other management characteristics. Determining the set of application characteristics may also include determining a set of communication characteristics associated with the application, and determining whether the application is suitable for use in the cloud computing system may include determining whether the set of communication characteristics is compatible with the cloud computing system.

The preceding figures and accompanying description illustrate example processes and computer implementable techniques. Environment 100 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors of an application gateway, the method comprising:
receiving, at the application gateway, an application package that includes: i) an application for execution in a cloud computing system that is communicatively coupled to the application gateway and ii) at least one test scenario for testing whether the application is suitable to be executed in the cloud computing system;
determining, by the application gateway, a set of application characteristics associated with the application based at least in part on an automatic analysis of the application that includes performing a test execution of the application, in an environment of the application gateway that simulates the cloud computing system, to determine at least one communication protocol supported by the application, wherein the test execution includes applying the at least one test scenario, included in the application package, to attempt to communicate with the executing application using a plurality of different communication protocols and designating the at least one communication protocol as supported by the application in response to a successful attempt to use the at least one communication protocol to communicate with the application during the test execution, and wherein the testing included in the automatic analysis is based at least in part on a trust level associated with an author of the application;
determining by the application gateway, that the application is suitable to be executed in the cloud computing system based at least in part on the at least one communication protocol being supported by the cloud computing system; and
in response to determining that the application is suitable to be executed in the cloud computing system, storing, by the application gateway, the application and at least a portion of the determined set of application characteristics in an application repository of the application gateway, and checking in the application to a repository of the cloud computing system for execution in the cloud computing system.

2. The method of claim 1, wherein the application repository is configured to store applications for use in the cloud computing system.

3. The method of claim 1, further comprising, in response to determining that the application is not suitable for use in the cloud computing system, storing the application and the determined set of application characteristics in the application repository with an untrusted status, wherein the application repository is configured to restrict access to applications with the untrusted status.

4. The method of claim 1, wherein determining the set of application characteristics further includes:
determining one or more test scenarios for the application; and
automatically performing the test execution of the application according to the one or more test scenarios to determine a set of test results associated with the application, wherein the set of application characteristics is determined based at least in part on the set of test results.

5. The method of claim 1, wherein identifying the application to be executed in the cloud computing system includes identifying a set of metadata associated with the application.

6. The method of claim 1, wherein the automatic analysis of the application is based on an analysis of a set of metadata associated with the application.

7. The method of claim 6, wherein the set of metadata includes the author of the application, and wherein the determination of whether the application is suitable for use in the cloud computing system is based at least in part on the trust level associated with the author of the application.

8. The method of claim 6, wherein the set of metadata includes a set of application execution requirements associated with the application including at least one of: a number of expected users, an expected reliability level, or an expected performance level.

9. The method of claim 6, wherein the set of application characteristics is determined based at least in part on the set of metadata.

10. The method of claim 1, wherein determining the set of application characteristics includes determining a set of communication characteristics associated with the application, and wherein determining whether the application is suitable for use in the cloud computing system includes determining whether the set of communication characteristics is compatible with the cloud computing system.

11. The method of claim 1, wherein determining the set of application characteristics includes determining a set of management characteristics associated with the application including at least one of: an interface for managing the application, an interface for monitoring the application, a set of dependencies for the application, or a restore procedure associated with the application.

12. A non-transitory, computer-readable medium storing instructions operable when executed to cause at least one processor of an application gateway to perform operations comprising:
receiving, at the application gateway, an application package that includes: i) an application for execution in a cloud computing system that is communicatively coupled to the application gateway and ii) at least one test scenario for testing whether the application is suitable to be executed in the cloud computing system;
determining, by the application gateway, a set of application characteristics associated with the application based at least in part on an automatic analysis of the application that includes performing a test execution of the application, in an environment of the application gateway that simulates the cloud computing system, to determine at least one communication protocol supported by the application, wherein the test execution includes applying the at least one test scenario, included in the application package, to attempt to communicate with the executing application using a plurality of different communication protocols and designating the at least one communication protocol as supported by the application in response to a successful attempt to use the at least one communication protocol to communicate with the application during the test execution, and wherein the testing included in the automatic analysis is based at least in part on a trust level associated with an author of the application;

determining, by the application gateway, whether the application is suitable to be executed in the cloud computing system based at least in part on the at least one communication protocol being supported by the cloud computing system; and in response to determining that the application is suitable to be executed in the cloud computing system, storing, by the application gateway, the application and at least a portion of the determined set of application characteristics in an application repository of the application gateway, and checking in the application to a repository of the cloud computing system for execution in the cloud computing system.

13. The computer-readable medium of claim 12, wherein the application repository is configured to store applications for use in the cloud computing system.

14. The computer-readable medium of claim 12, the operations further comprising, in response to determining that the application is not suitable for use in the cloud computing system, storing the application and the determined set of application characteristics in the application repository with an untrusted status, wherein the application repository is configured to restrict access to applications with the untrusted status.

15. The computer-readable medium of claim 12, wherein determining the set of application characteristics further includes:

determining one or more test scenarios for the application; and automatically performing the test execution of the application according to the one or more test scenarios to determine a set of test results associated with the application, wherein the set of application characteristics is determined based at least in part on the set of test results.

16. The computer-readable medium of claim 12, wherein identifying the application to be executed in the cloud computing system includes identifying a set of metadata associated with the application.

17. The computer-readable medium of claim 12, wherein the automatic analysis of the application is based on an analysis of a set of metadata associated with the application.

18. The computer-readable medium of claim 17, wherein the set of metadata includes an author of the application, and wherein the determination of whether the application is suitable for use in the cloud computing system is based at least in part on a trust level associated with the author of the application.

19. The computer-readable medium of claim 17, wherein the set of metadata includes a set of application execution requirements associated with the application including at least one of: a number of expected users, an expected reliability level, or an expected performance level.

20. A system comprising:

memory for storing data; and one or more processors of an application gateway operable to perform operations comprising:

receiving, at the application gateway, an application package that includes: i) an application for execution in a cloud computing system that is communicatively coupled to the application gateway and ii) at least one test scenario for testing whether the application is suitable to be executed in the cloud computing system;

determining, by the application gateway, a set of application characteristics associated with the application based at least in part on an automatic analysis of the application that includes performing a test execution of the application, in an environment of the application gateway that simulates the cloud computing system, to determine at least one communication protocol supported by the application, wherein the test execution includes applying the at least one test scenario, included in the application package, to attempt to communicate with the executing application using a plurality of different communication protocols and designating the at least one communication protocol as supported by the application in response to a successful attempt to use the at least one communication protocol to communicate with the application during the test execution, and wherein the testing included in the automatic analysis is based at least in part on a trust level associated with an author of the application;

determining, by the application gateway, whether the application is suitable to be executed in the cloud computing system based at least in part on the at least one communication protocol being supported by the cloud computing system; and in response to determining that the application is suitable to be executed in the cloud computing system, storing, by the application gateway, the application and at least a portion of the determined set of application characteristics in an application repository of the application gateway, and checking in the application to a repository of the cloud computing system for execution in the cloud computing system.

* * * * *